(12) United States Patent
Pudukotai et al.

(10) Patent No.: US 12,468,794 B2
(45) Date of Patent: Nov. 11, 2025

(54) SYSTEMS AND METHODS FOR GAIT-BASED USER AUTHENTICATION FOR LIGHTWEIGHT RESOURCE-CONSTRAINED WEARABLE DEVICES

(71) Applicant: George Mason University, Fairfax, VA (US)

(72) Inventors: Dinakarrao Sai Manoj Pudukotai, Herndon, VA (US); Pavlos Zouridakis, Fairfax, VA (US)

(73) Assignee: GEORGE MASON UNIVERSITY, Fairfax, VA (US)

( * ) Notice: Subject to any disclaimer, the term of this patent is extended or adjusted under 35 U.S.C. 154(b) by 70 days.

(21) Appl. No.: 18/609,320

(22) Filed: Mar. 19, 2024

(65) Prior Publication Data

US 2024/0394350 A1    Nov. 28, 2024

Related U.S. Application Data

(60) Provisional application No. 63/503,623, filed on May 22, 2023.

(51) Int. Cl.
*G06F 21/32* (2013.01)
(52) U.S. Cl.
CPC .................................. *G06F 21/32* (2013.01)
(58) Field of Classification Search
CPC ...................................................... G06F 21/32
See application file for complete search history.

(56) References Cited

U.S. PATENT DOCUMENTS

2021/0382970 A1\* 12/2021 Odinokikh ............... G06F 21/45
2022/0309471 A1\* 9/2022 Horan .................. G06V 40/172

FOREIGN PATENT DOCUMENTS

KR    102596738 B1 \* 10/2023 ............. G06V 40/25

OTHER PUBLICATIONS

M. Wazzeh, H. Ould-Slimane, C. Talhi, A. Mourad and M. Guizani, "A Continuous Authentication Approach for Mobile Crowdsourcing Based on Federated Learning," in IEEE Access, vol. 12, pp. 178237-178250, 2024, doi: 10.1109/ACCESS.2024.3507695. (Year: 2024).\*
Pavlos Zouridakis, et al., "Performance-aware Lightweight Dynamic Early-Exit-based Gait Authentication", IEEE, pp. 1-5, 2022.
Pavlos Zouridakis, et al., "Performance-and Energy-aware Gait-based User Authentication with Intermittent Computation for IOT devices", IEEE Transactions on Computer-Aided Design of Integrated Circuits, pp. 1-12, 2023.

\* cited by examiner

*Primary Examiner* — Techane Gergiso
(74) *Attorney, Agent, or Firm* — George Likourezos; Carter, DeLuca & Farrell LLP

(57) ABSTRACT

A system for gait-based user authentication, includes a processor and a memory. The memory includes instructions stored thereon, which when executed by the processor, cause the system to: access data relating to a gait of a user; provide the data as an input to an early escape network (EENet) having two or more early exits; dynamically determine by a deep Q-learning network (DQN) which of the two or more early exits of the EENet to take; dynamically determine by the EENet a predicted authentication at the determined exit; take the determined early exit by the EENet; and provide an authentication based on the predicted authentication at the determined early exit.

20 Claims, 10 Drawing Sheets

1100

---
Algorithm 1 DQN Overview
---

Input :   Input: (accuracy, time, MAC ops, energy)

Output :   Output: exit number (n)

1:   $state \leftarrow (0, 0, 0, 0)$                      ▷ initialization

2:   $b \leftarrow 0$

3:   while $b \times b_{size} \leq dataset_{size}$ do

4:       $exit_{no} \leftarrow n$    ▷ exit number is sent to eenet

5:       $accuracy, time, MAC, energy \leftarrow input$

6:       $state \leftarrow (accuracy, time, MAC, energy)$

7:       $R \leftarrow f(accuracy, time, energy)$

8:       $b \leftarrow b + 1$

9:   end while

FIG. 11

Algorithm 2 Creating checkpoints

Input : State: output tensor from previous layer

Output : Current progress is saved

1: *marker* ← 0
2: While next checkpoint is reached do
3:     *marker* ← *marker*+1
4:     *checkpoint* ← *(marker, state)*
5: end while
6: if exit is taken then
7:     delete checkpoint
8: end if

FIG. 13

Algorithm 3 Loading Checkpoints

Input : Authentication Request

Output : Execution Resumes from Last Saved Location
1: if Checkpoint Exists then
2:     *(marker, state)* ← *checkpoint*
3:     Check marker
4:     Go to checkpoint location indicated by marker
5:     *layer input* ← *state*
6:     Execution Resumes
7: else if No checkpoint exists then
8:     Start execution from the beginning
9: end if

FIG. 14

SYSTEMS AND METHODS FOR GAIT-BASED USER AUTHENTICATION FOR LIGHTWEIGHT RESOURCE-CONSTRAINED WEARABLE DEVICES

CROSS-REFERENCE TO RELATED APPLICATIONS AND CLAIM OF PRIORITY

This application claims the benefit of, and priority to, U.S. Provisional Patent Application No. 63/503,623, filed on May 22, 2023, the entire contents of which are hereby incorporated herein by reference.

GOVERNMENT SUPPORT

This invention was made with government support under grant number HR00111-20-0154 awarded by DOD/DARPA. The government has certain rights in the invention.

TECHNICAL FIELD

The present application relates to systems and methods for user authentication, and, more specifically, to a system for gait-based user authentication.

BACKGROUND

In today's digital landscape, ensuring secure and reliable user authentication remains paramount for safeguarding sensitive information and protecting against unauthorized access. Existing methods often face challenges such as susceptibility to phishing attacks, password breaches, and user inconvenience. As such, there is a need for innovative solutions that enhance authentication protocols by leveraging advanced technologies to fortify user security while maintaining user experience and convenience.

SUMMARY

In accordance with aspects of the present disclosure, a system for gait-based user authentication includes a processor; and a memory. The memory, includes instructions stored thereon, which when executed by the processor, cause the system to: access data relating to a gait of a user; provide the data as an input to an early escape network (EENet) having two or more early exits; dynamically determine by a deep Q-learning network (DQN) which of the two or more early exits of the EENet to take; dynamically determine by the EENet a predicted authentication at the determined exit; take the determined early exit by the EENet; and provide an authentication based on the predicted authentication at the determined early exit.

In an aspect of the present disclosure, the instructions when executed by the processor, may further cause the system to: prioritize, by the DQN at least one of accuracy, inference execution time, or energy consumption; and set parameters of a reward function.

In another aspect of the present disclosure, each of the early exits may include a classification prediction branch that uses a softmax activation function and a confidence branch that uses a sigmoid activation function.

In yet another aspect of the present disclosure, an output of the classification prediction branch is the prediction to a classification problem at that particular exit.

In a further aspect of the present disclosure, an output of the confidence branch is a confidence score $h_i$ for exiting at that exit.

In yet a further aspect of the present disclosure, when dynamically determining which of the two or more early exits of the EENet to take by the DQN, the instructions, when executed by the processor may further cause the system to: determine that a confidence score is higher than a confidence threshold T; and take, by the EENet, the early exit.

In an aspect of the present disclosure, the instructions when executed by the processor, may further cause the system to: determine that a confidence score is lower than a confidence threshold T; and continue determining an authentication prediction until $h_i > T$, or the EENet reaches a final exit, whichever comes first.

In another aspect of the present disclosure, the system may further include an inertial sensor configured to capture user gait data.

In yet another aspect of the present disclosure, the data relating to a gait of a user may include three axis of linear acceleration and three axes of gyroscopic acceleration.

In a further aspect of the present disclosure, the instructions when executed by the processor, may further cause the system to: train the EENet by back-propagation.

In accordance with aspects of the present disclosure, a computer-implemented method for gait-based user authentication, includes accessing data relating to a gait of a user; providing the data as an input to an early escape network (EENet) having two or more early exits; determining take by a deep Q-learning network (DQN) which of the two or more early exits of the EENet to take; determining by the EENet a predicted authentication at the determined exit; taking the determined early exit by the EENet; and providing an authentication based on the predicted authentication at the determined early exit.

In an aspect of the present disclosure, the method may further include prioritizing by the DQN at least one of accuracy, inference execution time, or energy consumption; and setting parameters of a reward function.

In another aspect of the present disclosure, each of the early exits may include a classification prediction branch and a confidence branch.

In yet another aspect of the present disclosure, an output of the classification prediction branch may be the prediction to a classification problem at that particular exit.

In a further aspect of the present disclosure, an output of the confidence branch may be a confidence score $h_i$ for exiting at that exit.

In yet a further aspect of the present disclosure, the method may further include when determining which of the two or more early exits of the EENet to take by the DQN: determining that a confidence score is higher than a confidence threshold T; and taking, by the EENet, the early exit.

In another aspect of the present disclosure, the method may further include determining that a confidence score is lower than a confidence threshold T; and continuing determining an authentication prediction until $h_i > T$, or the EENet reaches a final exit, whichever comes first.

In yet another aspect of the present disclosure, the data relating to a gait of a user may include three axis of linear acceleration and three axes of gyroscopic acceleration.

In a further aspect of the present disclosure, the method may further include training the EENet by back-propagation.

In accordance with aspects of the present disclosure, a non-transitory computer-readable medium storing instructions which, when executed by a processor, cause the processor to perform a method including: accessing data relating to a gait of a user; providing the data as an input to an early escape network (EENet) having two or more early exits; determining take by a deep Q-learning network (DQN) which of the two or more early exits of the EENet to take; determining, by the EENet, a predicted authentication at the determined exit; taking the determined early exit by the EENet; and providing an authentication based on the predicted authentication at the determined early exit.

Further details and aspects of exemplary embodiments of the present disclosure are described in more detail below with reference to the appended drawings.

BRIEF DESCRIPTION OF THE DRAWINGS

A better understanding of the features and advantages of the disclosed technology will be obtained by reference to the following detailed description that sets forth illustrative embodiments, in which the principles of the technology are utilized, and the accompanying drawings of which:

FIG. 11 is a diagram illustrating an example algorithm for use with the system of FIG. 1, in accordance with aspects of the present disclosure;

FIG. 13 is a diagram illustrating an example algorithm for use with the system of FIG. 1, in accordance with aspects of the present disclosure;

FIG. 14 is a diagram illustrating an example algorithm for use with the system of FIG. 1, in accordance with aspects of the present disclosure;

DETAILED DESCRIPTION

Figure 1:
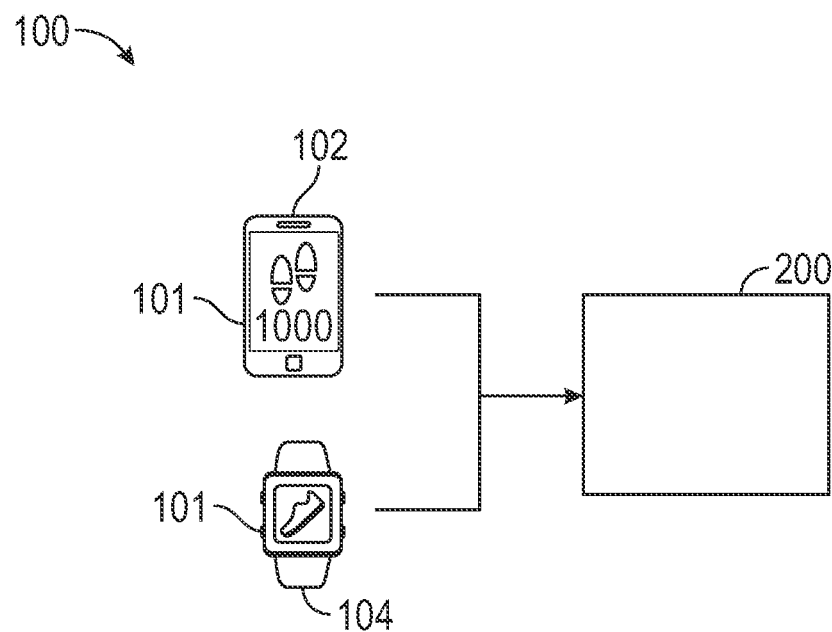
FIG. 1 is a diagram illustrating an exemplary system for gait-based user authentication, in accordance with aspects of the present disclosure.

The present application relates to systems and methods for user authentication, and, more specifically, to a system for gait-based user authentication.

For the purpose of promoting an understanding of the principles of the present disclosure, reference will now be made to exemplary embodiments illustrated in the drawings, and specific language will be used to describe the same. It will nevertheless be understood that no limitation of the scope of the present disclosure is thereby intended. Various alterations, rearrangements, substitutions, and modifications of the features illustrated herein, and any additional applications of the principles of the present disclosure as illustrated herein, which would occur to one skilled in the relevant art and having possession of this disclosure, are to be considered within the scope of the present disclosure.

Figure 2:
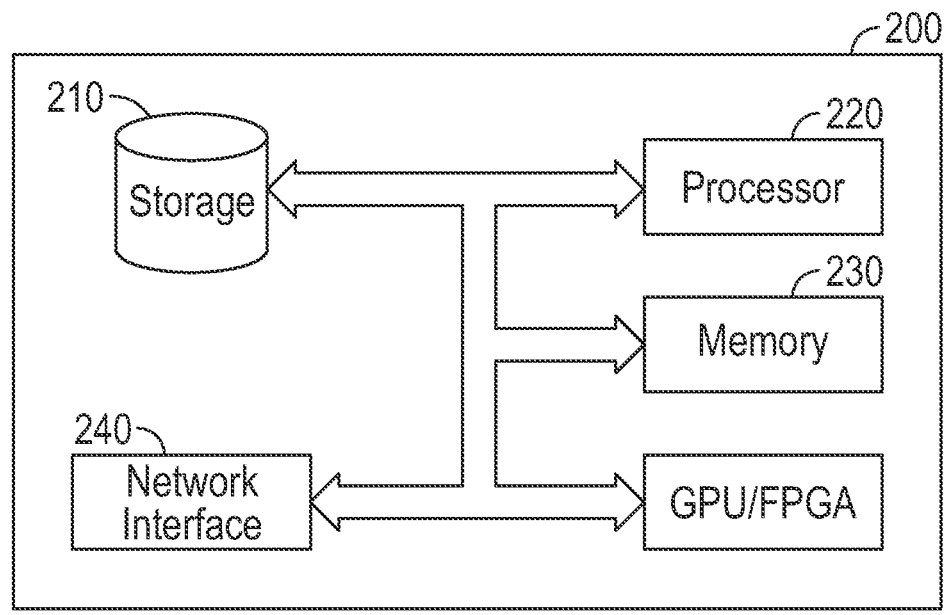
FIG. 2 is a block diagram of a controller of the system of FIG. 1, in accordance with aspects of the present disclosure.
Figure 3:
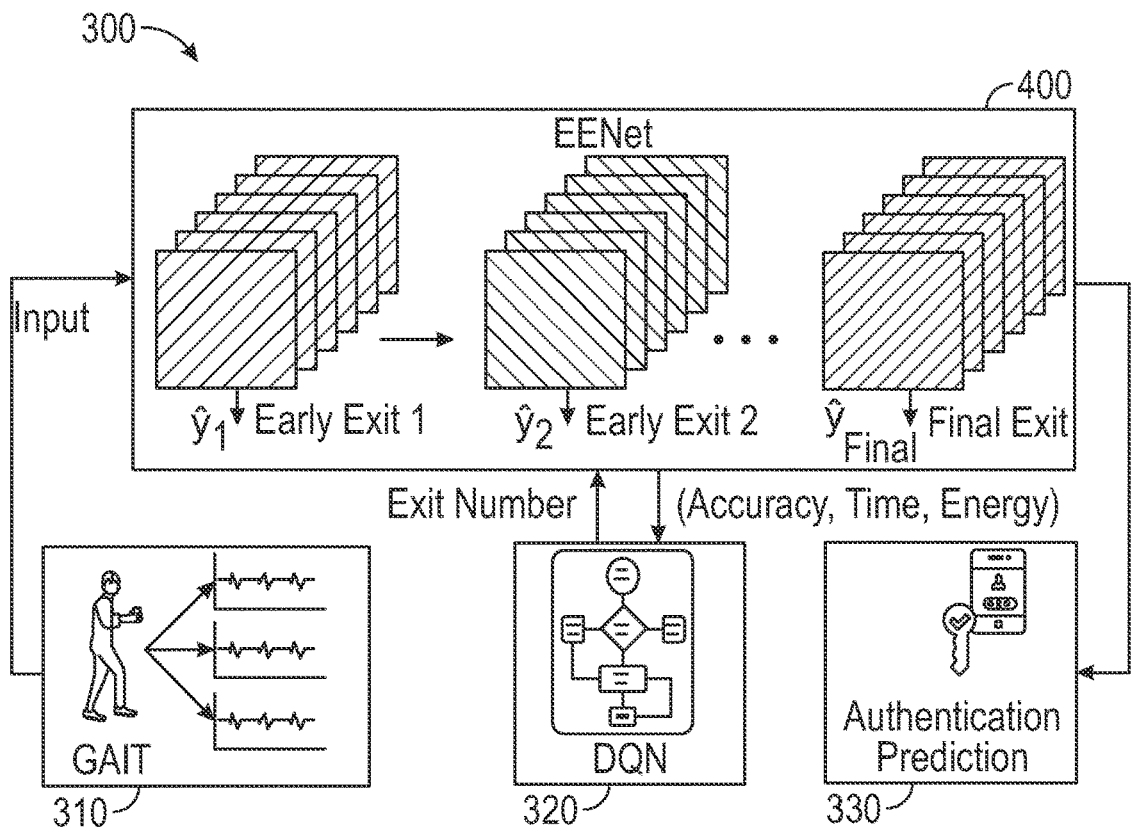
FIG. 3 is a block diagram of a machine learning network of the system of FIG. 1, in accordance with aspects of the present disclosure.

Referring to FIGS. 1-3, an exemplary system 100 for gait-based user authentication is shown in accordance with the present disclosure. The system 100 generally includes a sensor 101 (e.g., an inertial sensor) configured to capture gait-based data and a controller 200 configured to process the gait-based data using the network 300 of FIG. 3 with early exits and intermittent computations. The system 100 further includes an early exit network (EENet) 400 configured for determining an authentication prediction 330 for a user based on a gait signal, and a deep Q-learning network (DQN) 320 configured to determine which early exit the EENet 400 should use. Generally, deep learning neural networks benefit from a large number of layers. An EENet is a type of deep learning neural network that exits before the normal endpoint of the neural network. DQN uses a neural network to map input states to pairs via a three-step process: 1) initializing target and main neural networks, 2) choosing an action, and 3) updating network weights using the Bellman equation.

For example, input gait signal 310 may be captured by the sensor 101 (e.g., embedded inertial sensors on the user's device, such as a mobile device 102 and/or a smartwatch 104) and is sent to the EENet 400 for inference. The EENet 400 is configured to work in conjunction with the DQN 320. The DQN 320 can be configured to prioritize at least one of accuracy, inference execution time (e.g., the time it takes for the network to make a prediction or determination), and/or energy consumption and set the parameters of its reward function accordingly. Based on the input from the DQN 320 and the reward function, the DQN 320 directs the EENet 400 to take the most appropriate exit. The result of that process is the prediction of the EENet 400 with the authorization decision (authorization prediction). System 100 provides the benefit of ensuring the compatibility and efficiency of devices 102, 104, (e.g., an Internet of Things ("IoT") device) that are disconnected from the electrical power grid. To avoid termination due to exhaustion of the IoT device's power source, the system 100 employs an intermittent computation technique that can be deployed on any IoT device and perform gait-based authentication efficiently.

The system 100 provides the benefit of enabling continuous authentication of a user. The system 100 is configured to use energy harvesting to provide authentication of a user based on the gait of the user. In aspects, the authentication of the user may be used to provide access to systems such as smart weapons (e.g., a firearm that can detect its user), or access to computers.

Referring now to FIG. 2, exemplary components in the controller 200 in accordance with aspects of the present disclosure include, for example, a database 210, one or more processors 220, at least one memory 230, and a network interface 240. In aspects, the controller 200 may include a graphical processing unit (GPU) 250, which may be used for processing machine learning network models.

Database 210 can be located in storage. The term "storage" may refer to any device or material from which information may be capable of being accessed, reproduced, and/or held in an electromagnetic or optical form for access by a computer processor. Storage may be, for example, volatile memory such as RAM, non-volatile memory, which permanently holds digital data until purposely erased, such as flash memory, magnetic devices such as hard disk drives, and optical media such as a CD, DVD, Blu-ray Disc™, or the like.

In aspects, data may be stored on controller 200, including, for example, user preferences, historical data, and/or other data. The data can be stored in database 210 and sent via the system bus to processor 220. In aspects, data may be stored in a secure network (e.g., a cloud service) and/or streamed over a 5th generation mobile network or encrypted wireless network.

As will be described in more detail later herein, processor 220 executes various processes based on instructions that can be stored in the server memory 230 and utilizing the data from database 210. With reference also to FIG. 1, a request from a user device, such as a mobile device or a client computer, can be communicated to the server through the server's network interface 240. The illustration of FIG. 2 is exemplary, and persons skilled in the art will understand that other components may exist in a controller 200. Such other components are not illustrated in FIG. 2 for clarity of illustration.

Figure 4:
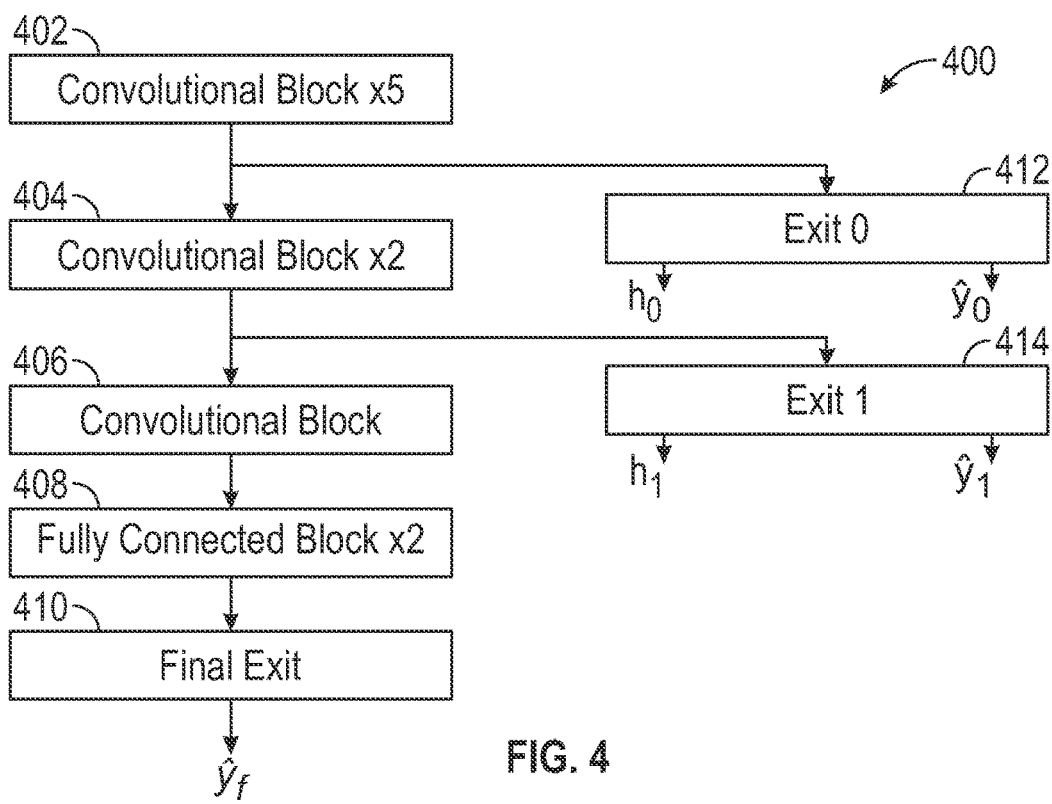
FIG. 4 is a diagram of an early exit network the system of FIG. 1, in accordance with aspects of the present disclosure.
Figure 5:
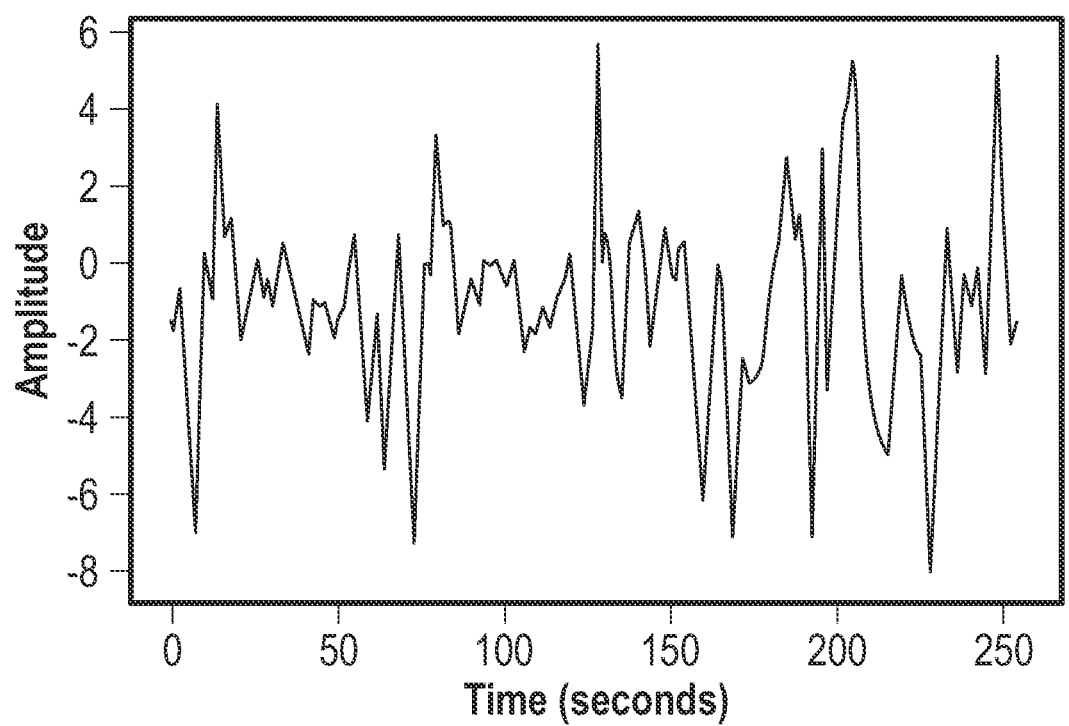
FIG. 5 is a graph illustrating an example gait input signal representing linear acceleration on the X axis, in accordance with aspects of the present disclosure.
Figure 6:
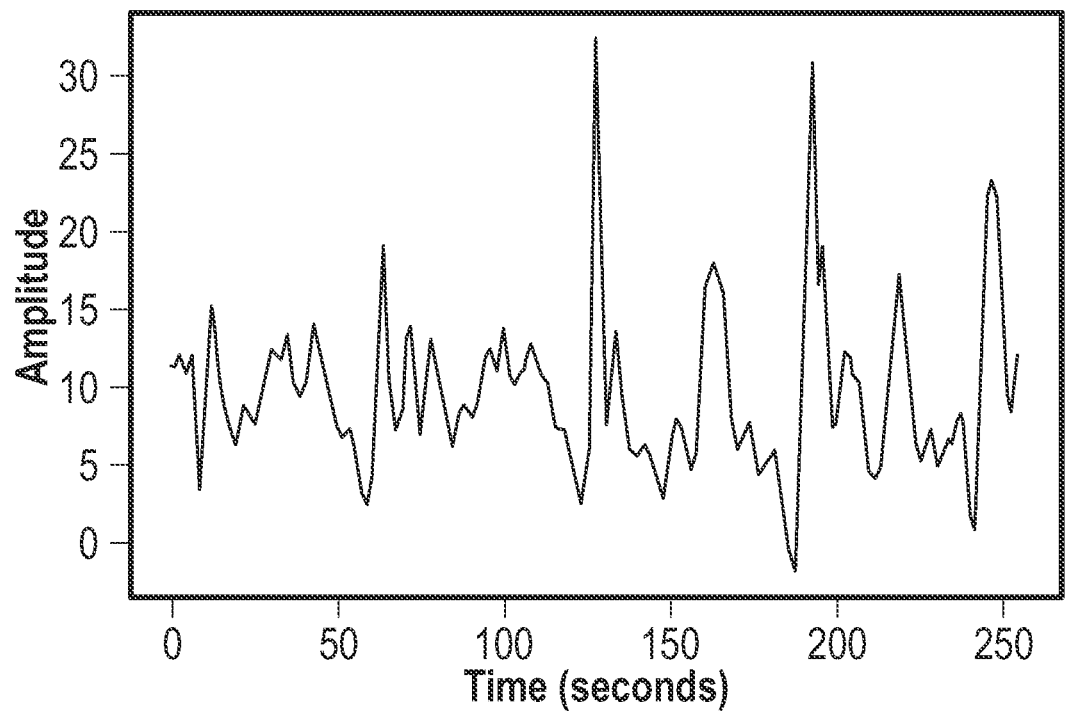
FIG. 6 is a graph illustrating an example gait input signal representing linear acceleration on the Y axis, in accordance with aspects of the present disclosure.
Figure 7:
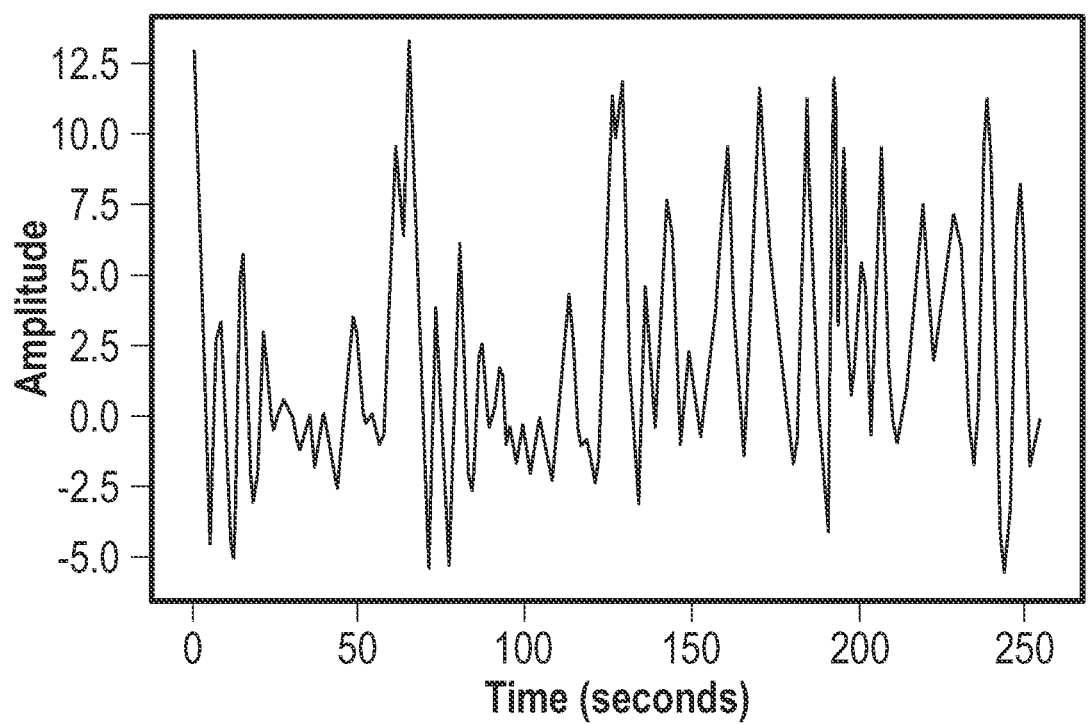
FIG. 7 is a graph illustrating an example gait input signal representing linear acceleration on the Z axis, in accordance with aspects of the present disclosure.
Figure 8:
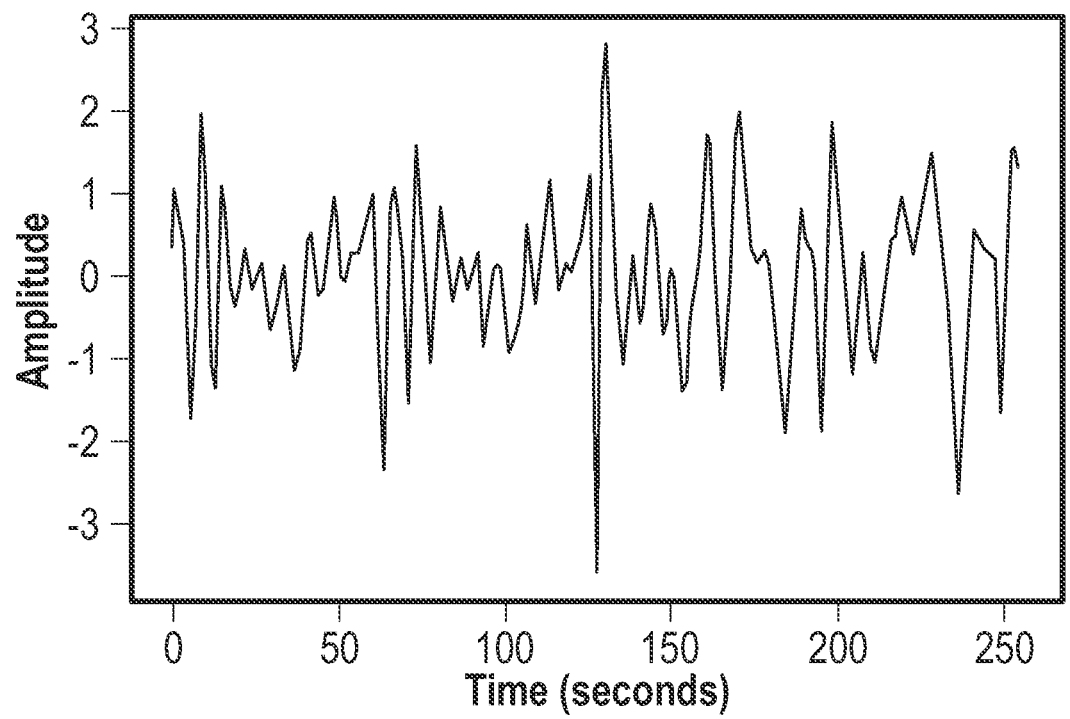
FIG. 8 is a graph illustrating an example gait input signal representing gyroscopic acceleration on the X axis, in accordance with aspects of the present disclosure.
Figure 9:
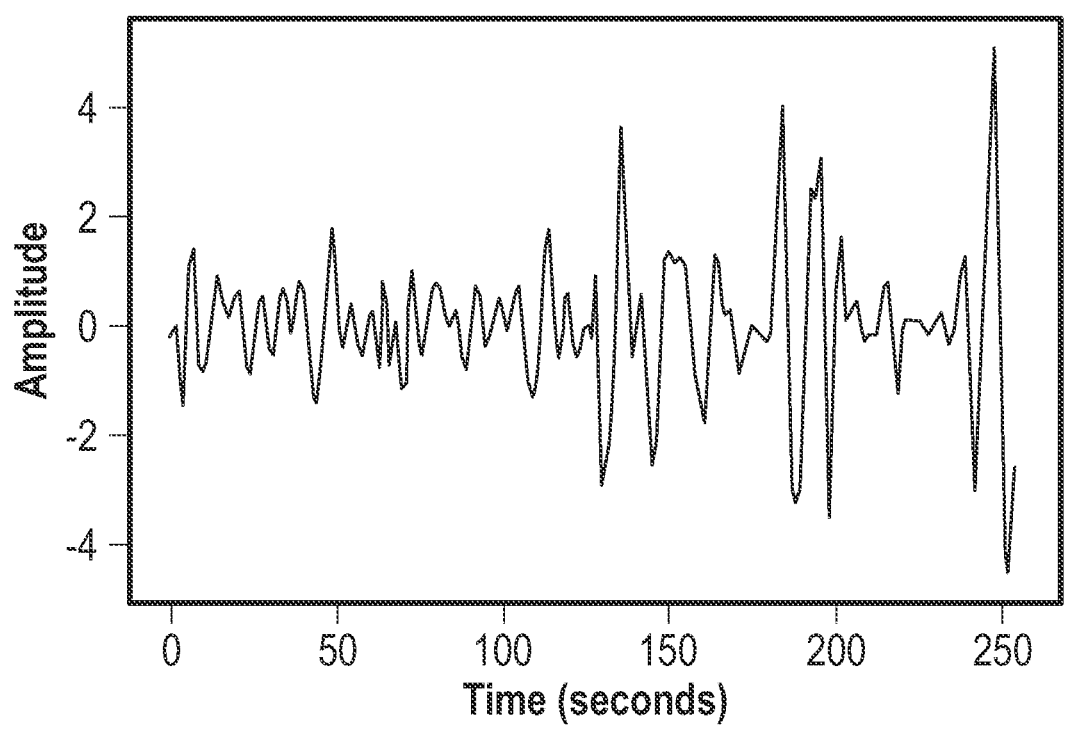
FIG. 9 is a graph illustrating an example gait input signal representing gyroscopic acceleration on the Y axis, in accordance with aspects of the present disclosure.
Figure 10:
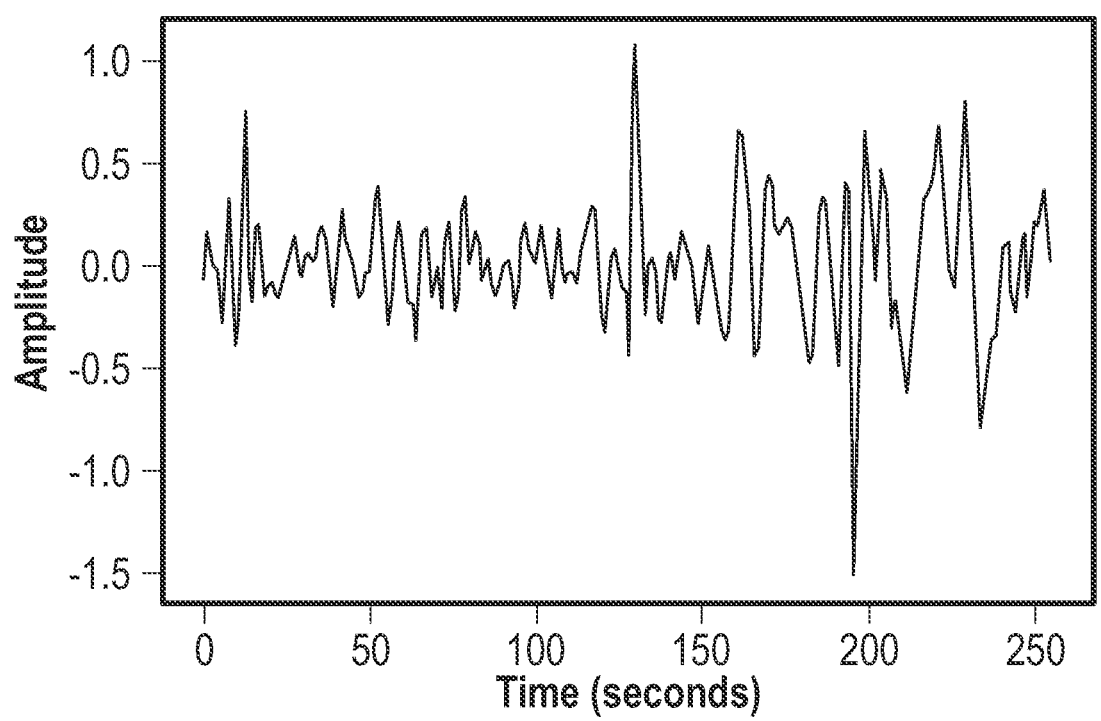
FIG. 10 is a graph illustrating an example gait input signal representing gyroscopic acceleration on the Z axis, in accordance with aspects of the present disclosure.

Referring to FIG. 4, the early exit network of the system of FIG. 1 is shown. The gait signals 310 (FIG. 3) that are captured by the sensor 101 are used as input for user authentication. The system 100 utilizes one or more EENets 400 to process the incoming gait signals 310 (FIG. 3). Compared to traditional convolutional neural networks (CNN), the use of EENets reduces the total amount of total computations and multiply-and-accumulate (MAC) operations. This is achieved by configuring a number of early exits inserted within the CNN of the EENet 400. The CNN takes the earliest exit for which it reaches a certain level of confidence that its classification decision is correct. As a result, the CNN may not need to run in its entirety to produce a prediction. Hence, there is a trade-off between performance and computational cost, making the deployment of EENets suitable on small and medium-scale devices with restricted resources.

The EENet 400 may be configured to have a variable number of early exits. The location of the early exits within the EENet 400 can be determined heuristically or may be determined by an algorithm. The number and location of the early exits largely depends on the size and architecture of the CNN used for the EENet 400. In general, a CNN with n convolutional layers can have a maximum of m early exits, where m≤ n at all times.

Every early exit has two distinct branches: a classification prediction branch that uses a softmax activation function and a confidence branch that uses a sigmoid activation function, as shown in FIG. 4. The output of the classification prediction branch is the prediction to the classification problem at that particular exit, whereas the output of the confidence branch is the confidence score $h_i$ for exiting at that exit. If the confidence score is higher than the confidence threshold T (e.g., a predetermined value for which the confidence score $h_i$ should be greater than), then this early exit is taken, and the algorithm stops running. Otherwise, the algorithm continues until it reaches an early exit, where $h_i > T$, or it reaches the final exit, whichever comes first. In aspects, the system 100 may reduce the confidence score threshold based on the remaining energy and/or resources of the IoT device.

The training of the EENet 400 may be achieved by back-propagation, with ADAM optimization. The model trains both the prediction and confidence branches independently for each early exit. The loss function that is used for the back-propagation during the training takes both prediction and cost into account and is defined as:

$$\mathcal{L} = \mathcal{L}_P + \lambda \mathcal{L}_C \quad \text{(Eqn. 1)}$$

where $\mathcal{L}_P$ represents the loss from classification prediction and $\mathcal{L}_C$ represents the loss from computational cost. To calculate the classification loss, the prediction vector is defined as follows:

$$\hat{Y}_0 = h_0 \times \hat{y}_0 + (1 - h_0)[h_1 \times \hat{y}_1 + (1 - h_1)[\ldots \quad \text{(Eqn. 2)}$$
$$h_N \times \hat{y}_N + (1 - h_N) \times \hat{y}_{final}]\ldots]$$

$$\hat{Y}_1 = h_1 \times \hat{y}_1 + (1 - h_1)[\ldots \quad \text{(Eqn. 3)}$$
$$h_N \times \hat{y}_N + (1 - h_N) \times \hat{y}_{final}]\ldots]$$

$$\hat{Y}_N = h_N \times \hat{y}_N + (1 - h_N) \times \hat{y}_{final} \quad \text{(Eqn. 4)}$$

$$\hat{Y}_{final} = \hat{y}_{final} \quad \text{(Eqn. 5)}$$

The $\hat{Y}_i$ represents the output prediction vector produced by all early exits between i and N. The $\hat{y}_i$ is the individual prediction for each exit and $h_i$ is the confidence for each respective prediction. Once the values are obtained from Eqn. 2 to Eqn. 5, the values are used to calculate the partial loss for classification according to Eqn.6:

$$\mathcal{L}_P = -\sum_{k=1}^{K} y_k \times \log(\hat{Y}) \quad \text{(Eqn. 6)}$$

where K is the number of classes that the model classifies for. The respective cost values ($C_0, C_1, \ldots, C_N, C_{final}$) are determined in the same way as described in Eqn. 2 to Eqn. 5 solving for cost instead of predicted value. The cost values are equal to the loss from computational cost:

$$\mathcal{L}_C = C \quad \text{(Eqn. 7)}$$

Thus, using Eqn. 1, Eqn. 6, and Eqn. 7 one can obtain the value for the loss function for each early exit that is used for back-propagation.

Once training is complete, the EENet is ready to perform inference and generate predictions for each input signal it receives. Each early exit i produces a confidence score $h_i$ and if $h_i > T$, where T is the confidence threshold, then that exit is taken and the local prediction $\hat{y}_i$ becomes the final classification decision $\hat{y}$. The confidence threshold T is set statically and it is the same across all early exits.

The disclosed system 100 provides the benefit of using an EENet that achieves high accuracy, while significantly reducing the computational cost of complex classification problems. The EENet framework can be applied to several deep neural networks, such as residual networks, which are very effective classification algorithms. Most classification algorithms, however, have been designed to process images or video. The shape of such inputs is different from the input that are used by the disclosed system 100 for gait-based authentication. The disclosed system 100 provides the benefit of enabling the extraction of a maximum number of features from the input with a minimum number of computations and in the smallest number of layers.

The lightweight EENet 400 needs to be small enough to run on hardware without parallelization support. Therefore, the EENet 400 should not have a large total number of convolutional layers, so that the EENet 400 can efficiently run even when no early exit is taken, and the algorithm runs to the end. The EENet 400 also needs to be able to produce sufficiently good accuracy even when the first early exit is taken. As a result, there is no added value to configure a large number of early exits, for example, having an early exit after each layer. An example implementation to satisfy these conditions for EENet 400, may implement a total of eight convolutional layers 402, 404, 406 followed by two fully connected layers 408. An example structure of the convolutional layers is shown in the below table:

| Layer | In channels | Out channels | Kernel size | Stride | Padding |
|---|---|---|---|---|---|
| Conv 1 | 1 | 2 | 3 | (1, 2) | 1 |
| Conv 2 | 2 | 4 | 3 | (1, 2) | 1 |
| Conv 3 | 4 | 8 | 3 | 1 | 1 |
| Conv 4 | 8 | 16 | 3 | 1 | 2 |
| Conv 5 | 16 | 16 | 3 | 1 | 2 |
| Conv 6 | 16 | 32 | 3 | 1 | 2 |
| Conv 7 | 32 | 64 | 3 | 1 | 1 |
| Conv 8 | 64 | 64 | 3 | 1 | 1 |

Each convolutional layer may be combined with a batch normalization layer and a ReLU activation function to form a convolutional block. Given the number of layers of the EENet 400, for example, two early exits may be used. The first exit 412 can be taken after the fifth convolutional block 402 and the second exit 414 can be taken after the seventh convolutional block 404, according to FIG. 4.

Regarding FIGS. 5-10, example gait input signals for use with the system 100 of FIG. 1 are shown. In order to use gait as an input signal, one needs to determine how to measure a user's walking form. The gait signals should be extracted efficiently with low overheads and low complexity. The system 100 may consider the following six measurements to represent the gait signal: the linear acceleration on the X, Y and Z axes and the gyroscopic acceleration, which is the rotation rate around the X, Y and Z axes.

The system 100 may be configured to utilize linear acceleration rather than absolute acceleration, as linear acceleration allows the system to disregard the influence of gravity on the measurements. Gravitational force adds unwanted noise to the measurements, since gravitational force is always present, with only small differences depending on altitude and latitude and does not contribute to identifying the user by their gait. Therefore, absolute acceleration can be ignored in favor of linear acceleration.

These gait measurements may be extracted from a lightweight embedded sensor 101 (such as a nine-axis motion tracking device) that can be found on user devices such as smartphones, tablets, smartwatches, and fitness trackers. For instance, a single sensor 101 can collect all the necessary data with minimal consumption (about 3.4 mA). The result is a tuple of six elements: three for linear acceleration (FIGS. 5-7) and three for gyroscopic acceleration (FIGS. 8-10) as mentioned. In aspects, each element may be comprised of 256 samples. More specifically, each sample is collected by identifying two continuous steps. Each step may be interpolated by the system to a fixed length of 128 samples using a linear interpolation function and a one-step overlap to increase the sample set efficiently. Based on the above, the pre-processing overhead requires only a small number of basic operations, and the overhead is negligible. Although 256 samples are used as an example, other suitable numbers of samples are contemplated.

Referring to FIG. 3, a block diagram of a machine learning network of the system of FIG. 1 is shown. The confidence threshold may be set statically for the EENet 400. Classification performance can vary however, depending on the application, the dataset used or the type of input. That can potentially make the static threshold inefficient and affect the performance-efficiency trade-off. This challenge is addressed by introducing a method for dynamic exit selection of the system 100 of FIG. 1. The dynamic exit selection is not a classification or a clustering problem. Rather, depending on the EENet state (input, accuracy, time, computations executed by the EENet 400, energy required for authentication), an action (exit selection) will be triggered. Considering the ability to perform such computations, reinforcement learning is used to determine the best possible exit selection during runtime.

More specifically, quality reinforcement learning (Q-learning) is used by the DQN 320. Q-Learning is a model-free stochastic algorithm that can identify optimal action selection. However, due to the convergence issues of traditional Q-learning, a deep Q-learning network (DQN) is employed. The use of DQN provides the technical benefit of removing correlations in the observation sequence and smooths the data distribution, addressing the converge issues that traditional Q-Learning may face. Given a set of states S and a set of actions A per state, when an action a∈ A is taken, the reinforcement learning agent transitions from state to state. The algorithm has a function that calculates the quality of each state-action combination, assigning a real number to it by using a reward function:

$$Q: A \times S \to \mathbb{R} \qquad \text{(Eqn. 8)}$$

The DQN 320 keeps getting updated every time that inference is run. By calculating and learning the reward value, DQN 320 learns how to make decisions about the best possible next action, and it gets trained to make the best decision possible in every subsequent situation. The DQN 320 used should be lightweight, so that the DQN 320 can work well in conjunction with the EENet, avoiding overheads.

Algorithm1 (FIG. 11) outlines the employed DQN 320 and the functionality of the DQN 320 based on the accuracy, inference time, number of MAC operations, and energy consumption of the EENet (FIG. 11). These three parameters are chosen qualitatively based on the nature of the application that is examined. Accuracy and inference time is important for authentication, whereas energy as well as inference time is important for the resource restricted IoT device environment. Therefore, these three parameters are focused on evaluating the performance of the DQN 320 and re-training it, to improve its predictions. As result, in the implementation of the DQN 320, the state is represented by a tuple that includes the values for accuracy, execution time for inference, the number of MAC operations required for inference and the energy that it takes to authenticate one sample. The action that moves the DQN agent from one state to the next is the exit that the EENet is directed to take. For example, the DQN 320 may be a simple sequential neural network, because a simple sequential neural network is smaller and quicker than other neural networks, such as recurrent, residual, etc. In an example embodiment, two hidden layers of twenty-four neurons each may be used. In aspects, the activation functions may be ReLU and use Adam optimization. Adam optimization is a stochastic gradient descent method that is based on adaptive estimation of first-order and second-order moments. The below table includes a study of a few different configurations for the disclosed DQN 320.

| Hidden Layers | No. of Neurons | Accuracy (%) | Inf. Time (ms) |
|---|---|---|---|
| 2 | 24 × 24 | 85.66 | 2.699 |
| 2 | 24 × 12 | 85.33 | 3.401 |
| 3 | 24 × 24 × 12 | 85 | 3.384 |
| 2 | 24 × 6 | 86.38 | 3.211 |
| 2 | 12 × 12 | 85.13 | 3.664 |

As shown in the table, for a relatively simple sequential neural network the differences in accuracy and execution time are small. Based on that, choose to use the DQN that produced the smallest execution time and second highest accuracy.

The reward function is expressed by the following equations:

$$R = \alpha \cdot R_a + \beta \cdot R_t + \gamma \cdot R_e \quad \text{(Eqn. 9)}$$

$$R_x = \begin{cases} r_{n+1}, & \text{if } x > \text{threshold}_n \\ r_n, & \text{if } \text{threshold}_{n-1} < x \leq \text{threshold}_n \\ \vdots & \vdots \\ r_0, & \text{otherwise} \end{cases} \quad \text{(Eqn. 10)}$$

where x stands for accuracy, inference time or energy and $R_x$ for $R_a$, $R_t$ or $R_e$ stand for the reward values for accuracy, inference time and energy consumption respectively. In Eqn. 9, $\alpha$, $\beta$ and $\gamma$ are scaling factors. The scaling factors enable the determination of the balance of the trade-off between accuracy, execution time and energy consumption and prioritization according to what is prioritized for that implementation.

Referring again to FIG. 11 in Algorithm1, the function of the proposed DQN 320 is shown. After initialization (Line 1), the algorithm works in batches (Lines 2 and 3). For each batch, the DQN 320 tells the EENet 400 what action to take (what exit to take) (Line 4). The EENet 420 runs inference for that batch (Line 5) and then sends the state in form of the tuple of accuracy, time, MAC operations and energy consumption back to the DQN 320 (Line 6). Then, the reward is calculated according to Eqn. 9 and Eqn. 10 (Line 7), and then the DQN 320 moves to the next batch. Based on its previous states and actions, the DQN 320 is trained to dynamically make the optimal decision according to the reward function and learns to predict the next best exit from the EENet 400. At the end of the process, the DQN 320 has worked with the EENet 400 to run inference on the entire testing dataset, and the statistics for each element of the state tuple may be obtained, along with the exit distribution from the EENet 400 for all samples.

The use of DQN 320 for determining the exit of the EENet 400 addresses the challenge of dynamic exit selection and reducing the number of MAC operations performed without trading off the performance. However, one needs to note that medium- and small-scale IoT devices are meant to be versatile and easy to deploy in a variety of different environments. It also indicates that these IoT devices are often deployed off the electrical grid, powered only by a battery or an energy harvester. This makes such IoT devices vulnerable to non-termination scenarios and power depletion attacks. For that reason, it is important to provide a framework that will allow all power-restricted devices to successfully complete the execution of the code that they run. In cases when the energy available to IoT devices is not sufficient to run their code, provisions are provided to ensure that the progress that the system 100 has made is saved. That way, when more energy becomes available, the system 100 can continue execution from the point where it was interrupted before. Accordingly, an intermittent computation technique may be used.

Intermittent computation to implementations are mostly applied microcontrollers. They mostly utilize non-volatile memory (NVM), but there are also techniques that utilize volatile memory. In either case, they are specific to the type of microcontroller and memory that they are developed for. That makes them very efficient, as they directly target specific memory locations to save and load checkpoints. That makes such implementations very efficient, but it also makes it difficult to adapt them to all other hardware.

In contrast, the intermittent computation implementation used by the system 100 is hardware agnostic and can run on any device where EENet 400 is deployed to run gait-based authentication. Static checkpoints may be used to ensure that the overhead used by the disclosed system 100 is as small and efficient as possible. Static checkpoints enable the storing of the output of certain layers on the system's DRAM before it is passed on to the next convolutional layer. For example, saving the checkpoint to DRAM is much faster than saving information to an SD card that the IoT devices may use as a main drive. DRAM is able to retain saved information for short amounts of time, even in the case of loss of power. There are implementations that use a stochastic approach for the placement of the checkpoints, but it is a less reliable approach. Additionally, given the small number of layers in EENet 400, it is unnecessary to introduce the added overhead of the stochastic algorithm to determine the checkpoint locations.

Figure 12:
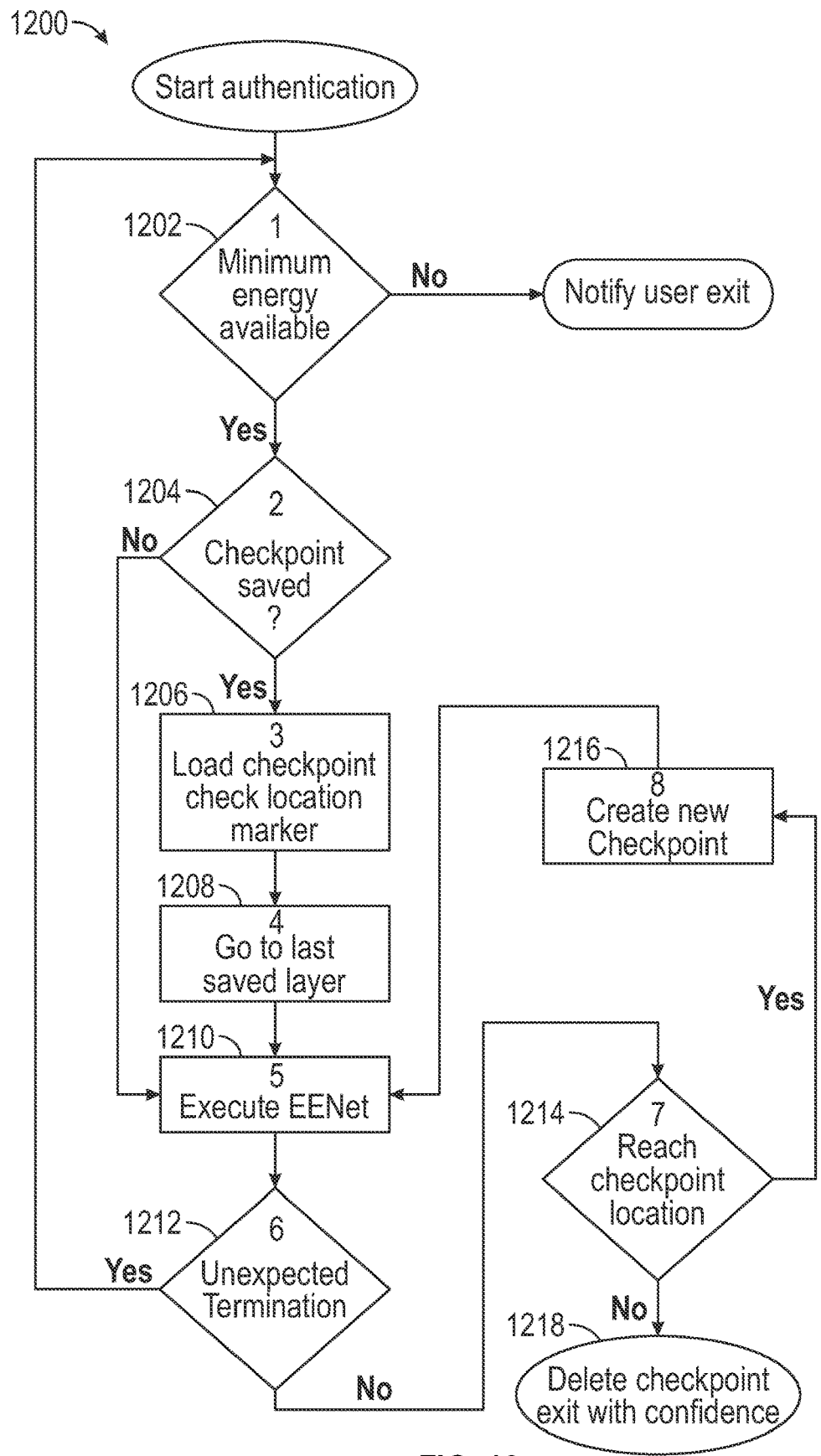
FIG. 12 is a flow diagram of an exemplary use of the system of FIG. 1, in accordance with aspects of the present disclosure.

FIG. 12 shows a method 1200 for an exemplary use of the system 100 of FIG. 1. Although the steps of method 1200 of FIG. 12 are shown in a particular order, the steps need not all be performed in the specified order, and certain steps can be performed in another order. For example, FIG. 12 will be described below, with a processor of an IoT device (e.g., controller 200 of FIG. 2) performing the operations. In various aspects, the method 1200 of FIG. 12 may be performed all or in part by controller 200 of FIG. 2. In other aspects, the method 1200 of FIG. 12 may be performed all or in part by another device, for example, a mobile device and/or a client computer system. These and other variations are contemplated to be within the scope of the present disclosure.

Checkpoints are built into the EENet 400 model so that non-termination can be avoided. At operation 1202, when the inference code that produces the authentication prediction starts, the EENet 400 first checks to see if the amount of energy that is available to the system $E_{av}$ is equal or greater to the minimum amount of energy required to get to the next checkpoint or exit during authentication $E_{min}$. If that is the case, then at operation 1204 the EENet 400 checks to see if there is a checkpoint saved or not. If not, at operation 1210, the EENet 400 starts executing the EENet from the beginning. If there is a checkpoint stored, at operation 1206, the checkpoint gets loaded, and the marker that points to the last saved location is checked. Then, at operation 1208, execution resumes from the last location where the checkpoint was taken. If at any point the EENet terminates, at operation 1212, the process starts over. When the execution reaches a checkpoint location at operation 1214, a new checkpoint is taken at operation 1216. If there was another checkpoint already in place, the new one would replace the old one at operation 1216. Execution then continues until it reaches an exit that the EENet can take with confidence or the final exit. Then, at operation 1218, the checkpoint gets deleted, and an authentication prediction is produced.

Considering that the model CNN can take an early exit, it is desirable to make the device use one of the early exits and produce an authentication decision, as that ensures that a smaller number of computations is performed compared to running the entire neural network. To inform the decision about the placement of the checkpoints, the number of operations that need to be performed by layer is considered, as shown in the table below:

| Layer | Input Shape | Output Shape | MAC | FLOPS |
| --- | --- | --- | --- | --- |
| Conv 1 | 1 × 6 × 256 | 2 × 6 × 128 | 27,648 | 15,360 |
| Conv 2 | 2 × 6 × 128 | 4 × 6 × 64 | 55,296 | 29,184 |
| Conv 3 | 4 × 6 × 64 | 8 × 6 × 64 | 221,1841 | 113,664 |
| Conv 4 | 8 × 6 × 64 | 16 × 8 × 66 | 1,216,512 | 616,704 |
| Conv 5 | 16 × 8 × 66 | 16 × 10 × 68 | 3,133,440 | 1,577,600 |
| Conv 6 | 16 × 10 × 68 | 32 × 12 × 70 | 7,741,440 | 3,897,600 |
| Conv 7 | 32 × 12 × 70 | 64 × 14 × 72 | 37,158,912 | 18,643,968 |
| Conv 8 | 64 × 14 × 72 | 64 × 14 × 72 | 74,317,824 | 37,223,424 |
| FC 1 | 64 | 20 | 2,540 | 1,280 |
| FC 2 | 20 | 2 | 78 | 40 |

There is an early exit after layer Conv 5 and another early exit after layer Conv 7. In the interest of creating as balanced a distribution of MAC operations as possible going from one entry point to the code to its nearest checkpoint or exit, the following is considered:

$$MAC(i) \simeq MAC(i+1) \quad \text{(Eqn. 11)}$$

where MAC (i) is the total number of MAC operations in i and $$i \in [\text{start} \to checkpoint1, checkpoint1 \to earlyexit1, \quad \text{(Eqn. 12)}$$
$$earlyexit \to checkpoint2, checkpoint2 \to earlyexit2]$$

Having balanced MAC (i) sections increases the likelihood that each checkpoint or exit is reached. As a result, it is less likely that there will be repeated instances when the device runs out of energy and shuts down. Every time a device runs out of energy, the computations it has performed-between the latest checkpoint and the point of sudden shutdown—are wasted and lost. Therefore, by limiting the times that there is a sudden shutdown, the total amount of wasted computations is reduced. By extension, the amount of wasted energy is reduced, and overhead is minimized.

The process of generating the checkpoints is described in Algorithm2 (FIG. 13). EENet 400 starts running and once the checkpoint location is reached, the first checkpoint is saved. A marker (Line 1) is used to keep track of the location where the state was saved, and the checkpoint was created. After that, execution continues. If there are no interruptions, the authentication process (EENet) will keep running until the EENet reaches the next checkpoint or decides to take an exit, i.e., the authentication process is complete. In the case where the next checkpoint is reached, the marker is increased, and the new checkpoint overwrites the previous one (Lines 2-5). If an exit is taken, the EENet produces its output, and the checkpoint is deleted (Lines 6-8).

State: output tensor from previous layer Current progress is saved marker←0 marker←marker+1 checkpoint←(marker, state) delete checkpoint The process of loading checkpoints is described in Algorithm3 (FIG. 14). Once the EENet starts executing, it checks to see if a checkpoint has been created. If so, it gets loaded (Line 2), and the marker gets checked to determine where the checkpoint was made (Line 3). Then, the tensor containing the last saved EENet state is loaded as an input to the next convolutional layer after the checkpoint is made (Lines 4-6). If a checkpoint has not been previously created, execution starts from the beginning (Lines 7-9).

Authentication Request Execution resumes from last saved location (marker, state)←checkpoint Check marker Go to checkpoint location indicated by marker layer$_i$nput-←state Execution resumes Start execution from the beginning.

Figure 16:
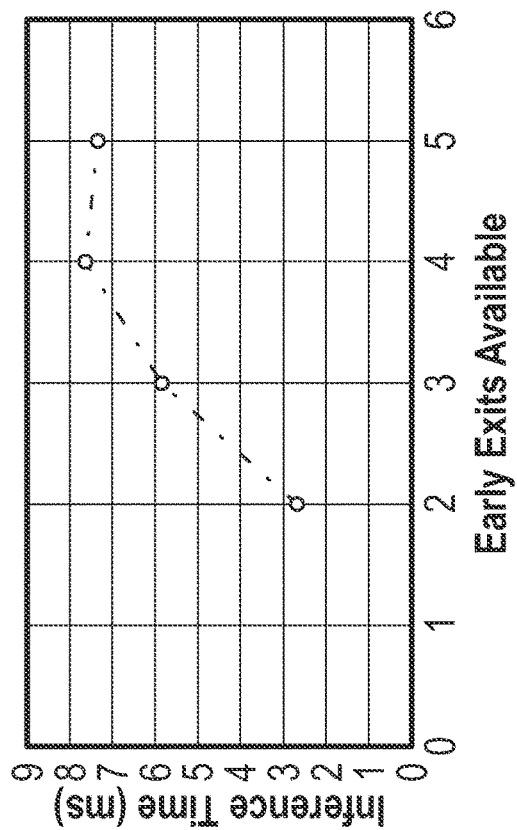
FIG. 16 is a graph illustrating the effect of the number of early exits on inference time for the system of FIG. 1, in accordance with aspects of the present disclosure.
Figure 15:
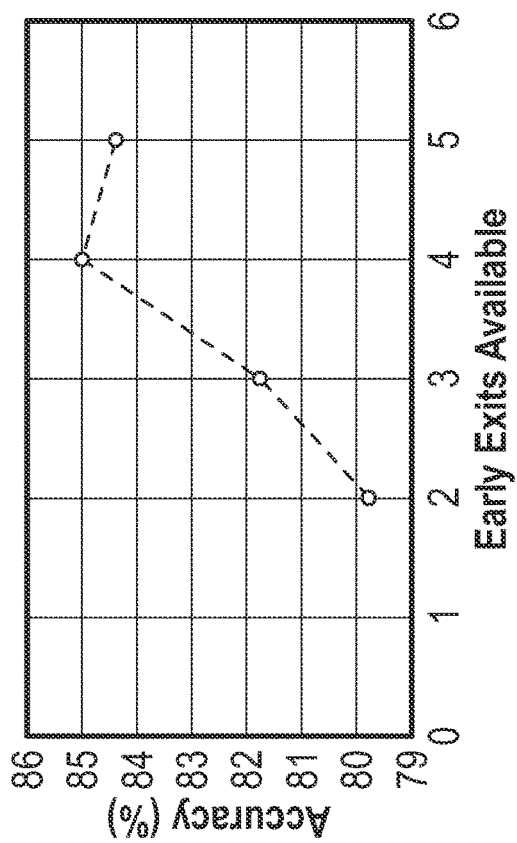
FIG. 15 is a graph illustrating the effect of the number of early exits on accuracy for the system of FIG. 1, in accordance with aspects of the present disclosure.

Simulations have been run to evaluate the methodology on two different environments: a PC with parallelization support and a medium-scale IoT device that runs on an ARM processor with no parallelization support. The PC embeds an Intel® i7 processor with 16 GB of RAM and an NVIDIA® GeForce® GTX1050 graphics card. The example IoT device for the experimental data is a Raspberry Pi® 4B, with an ARM® 64-bit processor and 8 GB of memory. For the setup, Ubuntu 22.04 LTS was used with a virtual environment with Python® 3.9.12, Pip® 22.1, Numpy® 1.22.3, PyTorch® and Torchvision® 1.11.0, Scipy® 1.8.0, and Tensorflow 2.8.0, built specifically to run on an arch64 architecture. The performance of the EENet framework to ResNets was compared as they have achieved high classification performance in a variety of applications, and they serve as a good classification benchmark. The EENet 400 (i.e., EENet-lite) framework was applied to ResNet18, ResNet34, and ResNet50, producing EENet18, EENet34, and EENet50 respectively. All these models are compared to the EENet 400 model. Tests were run to see how the number of exits on EENet34 affected accuracy and performance to determine how many early exits should be used for the ResNet-based EENets. The results can be seen in FIGS. 15 and 16.

Five early exits were considered. For the user authentication comparison, data from the whuGAIT dataset was used. The training set consists of more than 65,000 samples, and the test set consists of 7,600 samples. To evaluate the performance of the authentication, accuracy, inference time, and the number of MAC operations were considered. Please note that the computations required for the softmax layer at each exit of the neural network are included in the total amount of MAC operations. The exit distribution also tells us how many of the test samples were directed to take each exit. ResNets do not have any early exits built into them, while EENets have been configured with five possible early exits. The lightweight EENet-lite model has been configured with two possible early exits due to its small number of layers. The effect of the DQN 320 on the performance of different models is shown.

The results of the performance are shown on the table below, and inference times are marked based on the experiments using the PC environment. As expected, there is a trade-off between performance and efficiency. The ResNets achieve higher accuracy scores by 9.6% on average from the EENet counterparts, while the EENets execute two times faster and need to perform six times fewer MAC operations than the ResNets. Some of the difference in accuracy on EENets can be made up for using the DQN. The reward function of the DQN can evaluate previous predictions and improve performance dynamically.

| Model | Accuracy | Exit Distribution | Inf. Time | Avg. #Ops |
|---|---|---|---|---|
| eenet-lite | 74.37% | [7600, 0, 0] | 2.815 ms | 4.78M |
| eenet-lite + dqn | 85.66% | [2620, 2800, 2180] | 2.699 ms | 56M |
| resnet18 | 91.49% | NA | 7.354 ms | 137.89M |
| eenet18 | 79.70% | [0, 1215, 6332, 53, 0, 0] | 4.531 ms | 26.54M |
| eenet18 + dqn | 84.47% | [1210, 1150, 1230, 1290, 1400, 1320] | 5.763 ms | 49.06M |
| resnet34 | 91.71% | NA | 12.741 ms | 279.67M |
| eenet34 | 84.36% | [0, 0, 3308, 4292, 0, 0] | 7.319 ms | 51.94M |
| eenct34 + dqn | 85.99% | [1190, 940, 1300, 1470, 1370, 1330] | 6.978 ms | 86.42M |
| resnet50 | 86.55% | NA | 18.742 ms | 331.23M |
| eenet50 | 76.83% | [2, 6181, 1417, 0, 0, 0] | 7.023 ms | 46.9M |
| eenet50 + dqn | 85.99% | [990, 1140, 1230, 1520, 1410, 1310] | 9.737 ms | 97.28M |

More specifically, applying the DQN 320 (FIG. 3) improves accuracy by about 8.5%, but it comes with about 2.2 times more MAC operations and 0.87 ms slower inference time. To examine how the disclosed methodology works well on IoT devices with more limited resources, the table below shows how EENet-lite performs on the Raspberry Pi® 4 compared to the PC in terms of inference time.

| Model | Accuracy | Inf. Time (ARM) | Inf. Time (PC) | Avg. #Ops |
|---|---|---|---|---|
| eenet-lite exit1 | 74.37% | 110.41 ms | 2.815 ms | 4.78M |
| eenet-lite exit2 | 75.24% | 228.03 ms | 3.277 ms | 50.14M |
| eenet-lite + dqn | 85.66% | 254,12 ms | 2.699 ms | 56M |
| eenet34 | 84.36% | 1,244.48 ms | 7.319 ms | 51.94M |

Especially because the Raspberry Pi® uses its ARM processor with aarch64 architecture with no GPU support, its execution cannot be parallelized, and that is most evident when running EENet34. Running EENet-lite with DQN 320 on the Raspberry Pi® is five times faster than EENet34 while also achieving higher accuracy. The effect of using dynamically chosen exits compared to static exits can be seen. Utilizing the DQN 320 increases the authentication performance by more than about 10% while only requiring about 5.5% more operations than EENet-lite at the second exit. The difference between running on the ARM processor is that it takes, on average, 93 times longer to run a model on the Raspberry Pi®, as expected. When the differences between the runtimes for EENet-lite with and without DQN 320 were examined, it was demonstrated that the presence of DQN 320 has a different effect on the two platforms. That is caused by the different processor architectures and especially the presence of GPU and parallelization support on the PC.

The energy required to run EENet on Raspberry Pi® was tested without the implementation of intermittent computing to get a baseline of the power cost. EENet-lite was tested for early exits 1 and 2 with DQN support, as well as EENet34 with and without DQN support and ResNet34. The table below shows how they compare in terms of energy consumption and execution time. As expected, the number of operations required for each of these scenarios is reflected in the amount of energy required to complete said operations. It is also more pronounced on execution time because of the lack of parallelization on smaller devices. The energy savings of taking early exits are substantial. In general, the energy consumption of EENet-lite is 3.5 times to 41.8 times lower than ResNets.

| Model | Energy (mJ) | Time (ms) | Accuracy |
|---|---|---|---|
| eenet-lite exit1 | 505.489 | 110.41 | 74.37% |
| eenet-lite exit2 | 1,043.833 | 228.03 | 75.24% |
| eenet-lite + dqn | 1,172.143 | 254.12 | 85.66% |
| eenet34 | 5,929.222 | 1,244.48 | 84.36% |
| eenet34 + dqn | 9,486.752 | 1,991.168 | 85.99% |
| resnet34 | 21,130.711 | 4,435.11 | 91.71% |

The embodiments disclosed herein are examples of the disclosure and may be embodied in various forms. For instance, although certain embodiments herein are described as separate embodiments, each of the embodiments herein may be combined with one or more of the other embodiments herein. Specific structural and functional details disclosed herein are not to be interpreted as limiting, but as a basis for the claims and as a representative basis for teaching one skilled in the art to variously employ the present disclosure in virtually any appropriately detailed structure. Like reference numerals may refer to similar or identical elements throughout the description of the figures.

The phrases "in an embodiment," "in embodiments," "in various embodiments," "in some embodiments," or "in other embodiments" may each refer to one or more of the same or different embodiments in accordance with the present disclosure. A phrase in the form "A or B" means "(A), (B), or (A and B)." A phrase in the form "at least one of A, B, or C" means "(A); (B); (C); (A and B); (A and C); (B and C); or (A, B, and C)."

Any of the herein described methods, programs, algorithms, or codes may be converted to, or expressed in, a programming language or computer program. The terms "programming language" and "computer program," as used herein, each include any language used to specify instructions to a computer, and include (but is not limited to) the following languages and their derivatives: Assembler, Basic, Batch files, BCPL, C, C+, C++, Delphi, Fortran, Java, JavaScript, machine code, operating system command languages, Pascal, Perl, PL1, scripting languages, Visual Basic, metalanguages which themselves specify programs, and all first, second, third, fourth, fifth, or further generation computer languages. Also included are database and other data schemas, and any other meta-languages. No distinction is made between languages that are interpreted, compiled, or use both compiled and interpreted approaches. No distinction is made between compiled and source versions of a program. Thus, reference to a program, where the programming language could exist in more than one state (such as source, compiled, object, or linked) is a reference to any and all such states. Reference to a program may encompass the actual instructions and/or the intent of those instructions.

It should be understood that the foregoing description is only illustrative of the present disclosure. Various alternatives and modifications can be devised by those skilled in the art without departing from the disclosure. Accordingly, the present disclosure is intended to embrace all such alternatives, modifications, and variances. The embodiments described with reference to the attached drawing figures are presented only to demonstrate certain examples of the disclosure. Other elements, steps, methods, and techniques that are insubstantially different from those described above are also intended to be within the scope of the disclosure.

What is claimed is:

1. A system for gait-based user authentication, comprising:
   a processor; and
   a memory, including instructions stored thereon, which when executed by the processor, cause the system to:
      access data relating to a gait of a user;
      provide the data as an input to an early escape network (EENet) having two or more early exits;
      dynamically determine by a deep Q-learning network (DQN) which of the two or more early exits of the EENet to take;
      dynamically determine by the EENet a predicted authentication at the determined exit;
      take the determined early exit by the EENet; and
      provide an authentication based on the predicted authentication at the determined early exit.

2. The system of claim 1, wherein the instructions when executed by the processor, further cause the system to:
   prioritize, by the DQN at least one of accuracy, inference execution time, or energy consumption; and
   set parameters of a reward function.

3. The system of claim 1, wherein each of the early exits includes a classification prediction branch that uses a softmax activation function and a confidence branch that uses a sigmoid activation function.

4. The system of claim 3, wherein an output of the classification prediction branch is the prediction to a classification problem at that particular exit.

5. The system of claim 3, wherein an output of the confidence branch is a confidence score $h_i$ for exiting at that exit.

6. The system of claim 5, wherein the instructions when executed by the processor, further cause the system to:
   determine that a confidence score is lower than a confidence threshold T; and
   continue determining an authentication prediction until $h_i > T$, or the EENet reaches a final exit, whichever comes first.

7. The system of claim 1, wherein when dynamically determining which of the two or more early exits of the EENet to take by the DON, the instructions, when executed by the processor further cause the system to:
   determine that a confidence score is higher than a confidence threshold T; and
   take, by the EENet, the early exit.

8. The system of claim 1, further comprising an inertial sensor configured to capture user gait data.

9. The system of claim 1, wherein the data relating to a gait of a user includes three axis of linear acceleration and three axes of gyroscopic acceleration.

10. The system of claim 1, wherein the instructions when executed by the processor, further cause the system to:
    train the EENet by back-propagation.

11. A computer-implemented method for gait-based user authentication, comprising:
    accessing data relating to a gait of a user;
    providing the data as an input to an early escape network (EENet) having two or more early exits;
    dynamically determining take by a deep Q-learning network (DQN) which of the two or more early exits of the EENet to take;
    dynamically determining by the EENet a predicted authentication at the determined exit;
    taking the determined early exit by the EENet; and
    providing an authentication based on the predicted authentication at the determined early exit.

12. The computer-implemented method of claim 11, further comprising:
    prioritizing by the DQN at least one of accuracy, inference execution time, or energy consumption; and
    setting parameters of a reward function.

13. The computer-implemented method of claim 11, wherein each of the early exits includes a classification prediction branch and a confidence branch.

14. The computer-implemented method of claim 13, wherein an output of the classification prediction branch is the prediction to a classification problem at that particular exit.

15. The computer-implemented method of claim 13, wherein an output of the confidence branch is a confidence score $h_i$ for exiting at that exit.

16. The computer-implemented method of claim 15, further comprising:
    determining that a confidence score is lower than a confidence threshold T; and
    continuing determining an authentication prediction until $h_i > T$, or the EENet reaches a final exit, whichever comes first.

17. The computer-implemented method of claim 11, further comprising:
    when determining which of the two or more early exits of the EENet to take by the DQN:
       determining that a confidence score is higher than a confidence threshold T; and
       taking, by the EENet, the early exit.

18. The computer-implemented method of claim 11, wherein the data relating to a gait of a user includes three axis of linear acceleration and three axes of gyroscopic acceleration.

19. The computer-implemented method of claim 11, further comprising:
    training the EENet by back-propagation.

20. A non-transitory computer-readable medium storing instructions which, when executed by a processor, cause the processor to perform a method comprising:
    accessing data relating to a gait of a user;
    providing the data as an input to an early escape network (EENet) having two or more early exits;
    dynamically determining take by a deep Q-learning network (DQN) which of the two or more early exits of the EENet to take;
    dynamically determining by the EENet a predicted authentication at the determined exit;
    taking the determined early exit by the EENet; and
    providing an authentication based on the predicted authentication at the determined early exit.

* * * * *